United States Patent Office 3,448,067
Patented June 3, 1969

3,448,067
CHLORINE-CONTAINING POLYMERS STABILIZED WITH MIXTURES OF METAL SALTS OF MONO-ESTERS, A POLYOL AND AN EPOXY COMPOUND
Richard J. Penneck, Colchester, England, assignor to Bakelite Xylonite Limited, a British corporation
No Drawing. Filed Apr. 23, 1965, Ser. No. 450,528
Claims priority, application Great Britain, Apr. 25, 1964, 17,264/64
Int. Cl. C08f 45/62
U.S. Cl. 260—23      3 Claims

ABSTRACT OF THE DISCLOSURE

A stabilizing composition for chlorine containing polymers which comprises at least three metal salts of mono esters of $\alpha,\beta$-ethylenically unsaturated dicarboxylic acids in which the metals are different and selected from the group consisting of zinc, lithium, sodium, potassium, strontium, calcium and magnesium, and wherein the proportion by weight of each of the metal salts in relation to the weight of the chlorine containing polymer is present in an amount of at least 0.25 percent; a polyhydric alcohol containing from 4 to 36 carbon atoms in the hydrocarbon moiety and at least two hydroxyl substituents wherein the number of hydroxyl groups present is less than the number of carbon atoms and wherein the proportion by weight of polyhydric alcohol in relation to the weight of chlorine containing polymer is in the range 0.25 to 10 percent, and a stabilzing amount of an organic epoxide compound.

---

The present invention relates to stabilizing compositions for polymers and more particularly to metal salt containing stabilizing compositions for chlorine containing polymers and compositions thereof.

By the term "chlorine containing polymer" is meant throughout this specification any polymer in which at least 50 percent by number of the polymerized units are formed from chlorine containing unsaturated olefinic monomers. Examples of these monomers are vinyl chloride, vinylidene chloride and cis or trans dichlorethylene. They can be polymerized to form copolymers with monomers such as vinyl acetate, vinyl propionate, vinyl alkyl ethers and methacrylic, fumaric and maleic esters.

Typical chlorine containing polymers are polyvinyl chloride, post-chlorinated polyvinyl chloride, graft or block copolymers in which polyvinyl chloride is the main constituent, copolymers formed from vinyl chloride and vinylidene chloride containing about 4 percent by weight of vinylidene chloride, or vinyl chloride containing about 10 percent by weight of vinyl acetate, or vinyl chloride containing about 15 percent by weight of di-octyl fumarate, or vinyl chloride containing approximately 4 percent by weight of a vinyl alkyl ether such as vinylcetyl ether.

The polymers can be prepared by any appropriate method, e.g., a vinyl chloride homopolymer can be prepared by emulsion, suspension or bulk polymerization techniques and copolymers of vinyl chloride and vinyl acetate can be prepared by emulsion, suspension or solution techniques.

Chlorine containing polymers tend to undergo undesirable changes particularly with regard to color formation when fabricated at elevated temperatures and stabilizers have been incorporated in the polymer in attempts to prevent or reduce these changes. One class of stabilizers are the salts of certain metals, such as for example the lead, cadmium, zinc or calcium salts of mono esters of $\alpha,\beta$-ethylenically unsaturated dicarboxylic acids. However, stabilizers containing lead or cadmium salts have a relatively high toxicity.

Accordingly, it is an object of the present invention to provide novel stabilizing compositions of the metal salt type which have improved stabilizing properties, such as color, for chlorine containing polymers, while avoiding relatively high toxicity.

Another object of the present invention is to provide a composition consisting of a chlorine containing polymer and a stabilizing amount of the aforesaid stabilizing compositions of the metal salt type.

The present invention provides a stabilizing composition for chlorine containing polymers which comprises a zinc salt of a mono-ester of an $\alpha,\beta$-ethylenically unsaturated dicarboxylic acid and at least two metal salts of mono-esters of $\alpha,\beta$-ethylenically unsaturated dicarboxylic acids in which the metal radicals are different and selected from the group consisting of lithium, sodium or potassium, strontium, calcium and magnesium.

Mono-esters of $\alpha,\beta$-ethylenically unsaturated dicarboxylic acids from which the metal salts used to form the stabilizing compositions can be formed, include esters derived from alkyl, aryl or alkaryl alcohols. Particularly suitable esters are derived from alcohols having alkyl groups with a straight chain length of $C_1$ to $C_{18}$ and preferably from $C_1$ to $C_9$ carbon atoms. The preferred $\alpha,\beta$-ethylenically unsaturated dicarboxylic acids from which these esters can be derived are maleic, itaconic and fumaric acids.

Some examples of suitable esters are the mono-butyl, 2-ethyl hexyl, hexyl, cyclohexyl, n-heptyl, n-octyl, nonyl, decyl, lauryl, stearyl, and benzyl maleates or itaconates.

Typical salts are lithium butyl itaconate, lithium 2-ethyl hexyl maleate, lithium lauryl maleate, lithium stearyl maleate, strontium butyl itaconate, strontium 2-ethyl hexyl maleate, strontium lauryl maleate, strontium benzyl maleate, strontium cyclohexyl maleate, calcium butyl itaconate, calcium benzyl maleate, calcium 2-ethyl hexyl maleate, calcium cyclohexyl maleate, calcium n-heptyl maleate, calcium n-octyl maleate, calcium n-decyl maleate, magnesium butyl itaconate, magnesium 2-ethyl hexyl maleate, magnesium lauryl maleate, magnesium benzyl maleate, magnesium cyclohexyl maleate, sodium 2-ethyl hexyl maleate, sodium lauryl maleate, zinc butyl itaconate, zinc 2-ethyl hexyl maleate, zinc lauryl maleate, zinc benzyl maleate, and zinc cyclohexyl maleate.

The preferred salts are the zinc, strontium, magnesium, calcium and sodium 2-ethyl hexyl maleates and strontium and calcium butyl itaconates.

The proportion by weight of each of these metal salts in relation to the weight of polymer when these compositions are used as stabilizers can vary between wide limits and is most suitably 0.25 to 10 percent and preferably 0.5 to 4 percent.

Preferably an organic epoxide compound, as hereinafter defined, can be included in the metal salt compositions according to the present invention. By the term organic epoxide compound is meant throughout this specification a compound having a boiling point at atmospheric pressure of not less than 200° C. and at least one epoxy group in a carbon/carbon chain or in a carbon/carbon/oxygen chain or in a carbocyclic compound or an oxygen containing heterocyclic compound.

Examples of suitable organic epoxide compounds, but in no way limitative, are the epoxy vegetable oils, epoxy tall oil esters and epoxy resins such as polymers and copolymers of glycidyl methacrylate, e.g. polyglycidyl methacrylate; an 80:20 glycidyl methacrylate-acrylonitrile copolymer; a 50:50 glycidyl methacrylate-methyl methacrylate copolymer; a 70:30 glycidyl methacrylate-vinyl acetate copolymer and a 50:50 glycidyl methacrylate-vinyl chloride copolymer.

Preferably the number of carbon atoms in any carbon/carbon chain within the molecule should not exceed 30. The preferred compounds although not limited thereto are epoxy linseed oil, epoxy soya bean oil, isooctyl epoxy tallate, mono-bromo phenyl glycidyl ether, dibromo cresyl glycidyl ether, glyceryl epoxy mono oleate, 3,4-epoxy-6-methyl cyclohexyl methyl 3,4-epoxy-6-methyl cyclohexane carboxylate, the diglycidyl ether of bis phenol A, Dow Epoxy Resin 332, a liquid epoxy resin of the bis phenol A type, and Dow Epoxy Resin X–26732 and X–26736 both of which are straight chain diglycidyl ethers of various molecular weights.

The proportion by weight of organic epoxide compound in relation to the weight of the polymer when the composition is used as a stabilizer, can vary within wide limits and is suitably in the range 0.5 to 15 percent.

Alternatively or additionally to the organic epoxide compound a polyhydroxy compound and an organic sulfur bearing compound can be included in the metal salt stabilizing composition.

Any compound having a boiling point at atmospheric pressure of at least 200° C. and at least two hydroxyl groups, at least one of which is not sterically hindered, can be employed as the polyhydroxy compound. Polyhydroxy compounds useful in the practice of this invention can be represented by any one of the formulae (1) $R(CHOH)_n(CH_2)_m(CHOR^1)_p(CH_2)_q(CHOR^2)_rR^3$ wherein $R$, $R^1$, $R^2$, and $R^3$ can be same or different and represent hydrogen, or an alkyl, aryl alkoxy, aryloxy, or a hydroxy alkyl radical and substituted derivatives of such radicals, $m$, $p$, $q$, $r$ are zero or any integer, and $n$ is any integer except where $m$, $p$, $q$, and $r$ are zero, in such case, $n$ is an integer greater than 1.

(2) $R_1CH_2C(CH_2OH)_3$ wherein $R_1$ represents a hydrogen, hydroxyl, alkyl, alkoxy, hydroxy alkyl or hydroxy alkoxy radical and substituted derivatives of such radicals.

(3) 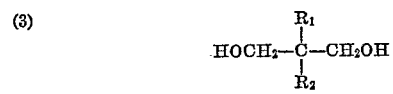

wherein $R_1$ represents hydrogen, an alkyl radical having 1 to 12 carbon atoms, or an aryl radical and substituted derivatives of such radicals and $R_2$ represents an alkyl radical having 1 to 12 carbon atoms or an aryl radical and substituted derivatives of such radicals.

(4) $HOCH_2—R_1—CH_2OH$ wherein $R_1$ represents a divalent hydrocarbon radical based on cyclohexane and substituted derivatives of such a radical.

(5) 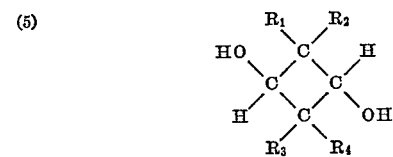

wherein $R_1$, $R_2$, $R_3$ and $R_4$ represent hydrogen, alkyl, aryl or alkyl aryl radical and substituted derivatives of such radicals which can be the same or different.

(6) 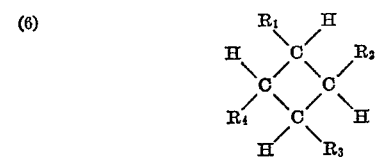

wherein $R_1$, $R_2$, $R_3$ and $R_4$ represent hydrogen or a —$CH_2OH$ group, and at least two of the symbols $R_1$, $R_2$, $R_3$ and $R_4$ represent $CH_2OH$ groups.

(7) Phenolic antioxidants in which the hydroxyl groups are not sterically hindered.

In the above definitions of suitable polyhydroxy compounds, substituted derivatives of the various defined radical can be present. Examples of substituents are the following groups: hydroxyl, carboxyl, ketone, aldehyde, amine, mercapto, sulfonic acid and halogen.

Some examples of suitable polyhydroxy compounds are sorbitol, mannitol, gluconic acid, erythorbic acid, glycol, glycerol, 1-thioglycerol, penta-glycerol (pentaglycine), 2-amino-2-hydroxymethyl 1-3 propane diol, glycerol monophenylether, erythritol, pentaerythritol, dipentaerythritol, 3-chloro-1,2-propane diol and polysaccharides such as starch (amylose and amylopectin) and cellulose, glyceryl cresyl ether acetate, 1,2,6-hexanetriol, trimethylol propane, polyglycerol, polyvinyl alcohol, glycerol monoacetate, 2-methyl-2-hydroxy methyl 1-3 propane diol, trimethylol ethane, diphenylol propane and 3,3,5,5-tetramethyl-4,4-diphenylol propane.

The preferred polyhydroxy compounds, but in no way limitative, are 2,2-dimethyl 1-3 propane diol; 2,2-diethyl 1-3 propane diol; 2-methyl, 2-ethyl 1-3 propane diol; 1-4 cyclohexane dimethanol; 2-ethyl, 2-butyl 1-3 propane diol; 2,2-dibutyl 1-3 propane diol; 2,2,4,4-tetramethyl 1-3 cyclobutane diol; 2,2,4,4-tetraethyl 1-3 cyclobutane diol; 1,2,3,4-tetramethylol cyclobutane; 2,2-dimethyl 1-3 cyclobutane diol.

The proportion by weight of polyhydroxy compound in relation to the weight of the polymer when these compositions are used as stabilizers can vary within wide limits and is suitably 0.25 to 10 percent and preferably 1 to 5 percent.

By the term "organic sulfur bearing compound" is meant an organic sulfur bearing compound having a boiling point at atmospheric pressure of not less than 200° C., which contains at least one sulfur atom with at least one lone electron pair and can be represented by the formula:

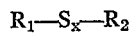

wherein $R_1$ can be selected from the group consisting of hydrogen, alkyl, alkenyl, alkynyl, aralkyl, aryl, alkyl aryl or cycloalkyl radical, or a radical having a heterocyclic ring containing nitrogen, oxygen or sulfur or substituted derivatives of these radicals; $R_2$ can be selected from the group consisting of alkyl, alkenyl, alkynyl, aralkyl, aryl, alkyl aryl or cycloalkyl radical, or a radical having a heterocyclic ring containing nitrogen, oxygen or sulfur or substituted derivatives of these radicals; and $x$ is a positive integer having a value from 1 to 2 inclusive. Examples of substituents are the following groups: hydroxyl, alkoxy, carboxyl, carboxylate, ketone, aldehyde, amine, mercapto, sulfonic acid and halogen. The organic sulfur bearing compound should preferably not be oxidizable to a colored compound where the stabilizer is to be used in polymers in which color is undesirable.

The preferred organic sulfur bearing compounds, but in no way limitative, are thioglycollic acid, thiodigylcollic acid, dithiodiglycollic acid, β-mercapto propionic acid, β,β'-thiodipropionic acid, dilauryl dithiodipropionate, dilauryl - β,β - thiodipropionate, lauryl thioglycollate, dilauryl dithioglycollate, bis (n-dodecyloxy ethyl) sulfide, 3-benzyl mercapto propionic acid, dithiodipropionic acid, S-benzyl thioglycollic acid, β,β'-dihydroxy ethyl sulfide, dibenzyl sulfide and dibenzoyl disulfide.

The proportion by weight of sulfur compound in relation to the weight of polymer when the composition is used as a stabilizer can vary within wide limits and is suitably in the range 0.1 to 5 percent.

The present invention is further chlorine containing polymer compositions comprising a chlorine containing polymer and a metal salt stabilizer composition as hereinbefore described either alone or together with the combinations of the epoxy, polyhydroxy and/or sulfur compounds herein described.

The chlorine containing polymer compositions can also contain plasticizers and other stabilizers such as metal sequestering agents, and ultra violet light absorbers. Examples of such compounds include triphenyl phosphite, various substituted benzophenones and benzotriazoles. The polymer mixtures may also contain any of the usual coloring and toning pigments, fillers and lubricants.

The metals salt stabilizer compositions of the present invention have relatively low toxicity and give a stabilizing effect which is greater than that which would have been expected by the summation of the individual effects of the components of the composition.

The invention is illustrated by the following non-limiting examples.

EXAMPLE 1

80 grams of a vinyl chloride and vinyl acetate copolymer containing 10 percent copolymerized vinyl acetate and 20 grams of a vinyl chloride-dioctyl fumarate copolymer containing about 15 percent of copolymerized dioctyl fumarate were mixed with 1 gram of Wax OP and a metal salt stabilizer composition comprising 2 grams calcium 2-ethylhexyl maleate, 1 gram magnesium 2-ethylhexyl maleate and 1 gram zinc 2-ethylhexyl maleate. The copolymer mixture and stabilizer composition were milled at 165–170° C. in a twin roll mill. There was little color at first but the mixture was pale yellow by 15 minutes and orange tan by 30 minutes.

By way of comparison the stabilizer composition previously described in this example was replaced by the following metal salts with the following results:

(a) 1 gram of zinc 2-ethylhexyl maleate—the mixture went dark green/black in less than 5 minutes milling.

(b) 2 grams of calcium 2-ethylhexyl maleate—the mixture went pink within 1 minute, and red after 10 minutes' milling.

(c) 1 gram of magnesium 2-ethylhexyl maleate—the mixture went light tan after 1 minute and brown after 5 minutes' milling.

(d) 2 grams of calcium 2-ethylhexyl maleate and 1 gram of zinc 2-ethylhexyl maleate—the mixture was colorless for 5 minutes and went dark green/black after ten minutes' milling.

(e) 1 gram of magnesium 2-ethylhexyl maleate and 1 gram of zinc 2-ethylhexyl maleate—the mixture went red/brown after 5 minutes' milling.

(f) 2 grams of calcium 2-ethylhexyl maleate and 1 gram of magnesium 2-ethylhexyl maleate—the mixture went dark green/black after 5 minutes' milling.

EXAMPLE 2

A resin mixture comprising 80 grams of a vinyl chloride-vinyl acetate copolymer containing 10 percent copolymerized vinyl acetate and 20 grams of a vinyl chloride-dioctyl fumarate copolymer containing 15 percent copolymerized dioctyl fumarate and 1.0 gram Wax OP were mixed with a metal salt stabilizer composition comprising 2.0 grams calcium 2-ethylhexyl maleate, 1.0 gram zinc 2-ethylhexyl maleate and 0.75 gram magnesium 2-ethylhexyl maleate, together with 2.0 grams 2,2-dimethyl 1-3 propane diol, 0.5 gram dilauryl thiodipropionate and 4 grams of bisphenol A diglycidyl ether. The resin and stabilizer were milled at 165–170° C. After 45 minutes milling a very pale yellow color developed which turned to light yellow after 60 minutes' milling.

EXAMPLE 3

The same polymer composition was used in this example as in Example 2 with the exception that the bisphenol A diglycidyl ether was replaced with Araldite X 83/166 containing units which can be represented by the formula:

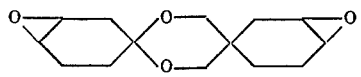

The resin and stabilizer were milled in the same way as described in Example 2. The mixture was light yellow at 45 minutes and bright yellow at 60 minutes.

EXAMPLE 4

The same polymer composition was used in this example as in Example 2 with the exception that the bisphenol A diglycidyl ether was replaced with iso-octyl epoxy tallate. The resin and stabilizer were milled in the same way as described in Example 2. The mixture was light yellow at 45 minutes and brown at 60 minutes.

EXAMPLE 5

100 grams of the resin components described in Example 2 were mixed with 1 gram Wax OP and a metal salt stabilizer composition comprising 2.0 grams calcium 2-ethylhexyl maleate, 1.0 gram zinc 2-ethylhexyl maleate, 0.75 gram magnesium 2-ethylhexyl maleate, 0.5 gram dilauryl thiodipropionate, 4.0 grams epoxy soya bean oil and 2 grams glycerol mono ricinoleate. The resin and stabilizer were milled at 165–170° C. The mixture was light yellow at 45 minutes and bright yellow at 60 minutes milling.

EXAMPLE 6

The polymer composition described in Example 5 was used in this example with the glycerol mono ricinoleate replaced by pentaerythritol. The resin and stabilizer which were milled in the same way as that described in Example 5. The mixture was light yellow at 45 minutes and at 60 minutes.

EXAMPLE 7

The polymer composition described in Example 5 was used in this example with the glycerol mono ricinoleate replaced by sorbitan mono stearate. The resin and stabilizer were milled in the same way as that described in Example 5. The mixture was bright yellow at 45 minutes and 60 minutes.

EXAMPLE 8

The polymer composition described in Example 5 was used in this example with the glycerol mono ricinoleate replaced by polyoxyethylene sorbitan mono-oleate. The resin and stabilizer were milled in the same way as that described in Example 5. The mixture was bright yellow at 45 minutes and 60 minutes.

EXAMPLE 9

80 grams of a vinyl chloride-vinyl acetate copolymer containing 10 percent copolymerized vinyl acetate and 20 grams of a vinyl chloride-dioctyl fumarate copolymer containing about 15 percent copolymerized dioctyl fumarate were mixed with 1 gram Wax OP and as a metal salt stabilizer composition, 2 grams strontium 2-ethylhexyl maleate and 0.75 gram of each of magnesium and zinc 2-ethylhexyl maleates. The resulting composition was milled on an open twin roll mill at 165–170° C. After 30 minutes milling the plastic was an orange tan color. By way of comparison the polymer composition without the metal salts when milled in a similar manner turned a very dark brown after 15 minutes.

EXAMPLE 10

A polymer composition was prepared in exactly the same way as described in Example 9, but in addition 4.0 grams epoxy soya bean oil was used. After 30 minutes' milling at 165–170° C., the plastic was a bright yellow color, while after 60 minutes the color had degraded only to an orange-tan.

EXAMPLE 11

A polymer composition was prepared in exactly the same way as described in Example 9, but in addition 2.0 frams 2,2-dimethyl 1-3 propane diol and 0.25 gram dilauryl thiodipropionate were used. After 30 minutes' milling at 165–170° C. the plastic was a light tan color.

EXAMPLE 12

80 grams of a vinyl chloride-vinyl acetate copolymer containing 10 percent copolymerized vinyl acetate and 20 grams of a vinyl chloride-dioctyl fumarate copolymer containing 15 percent copolymerized dioctyl fumarate and 0.25 gram lubricant (Wax OP) were mixed with a metal salt stabilizer composition comprising 2 grams strontium 2-ethylhexyl maleate, 0.75 gram of each of magnesium and zinc 2-ethylhexyl maleate, 2.0 grams of 2,2-dimethyl 1-3 propane diol, 0.25 gram dilauryl thiodipropionate and 4.0 grams epoxy soya bean oil.

The stabilizer composition and copolymer mixture were then milled on an open twin roll mill at temperature of 165–170° C. After one hour of milling the plastic was still only yellow in color.

EXAMPLE 13

100 grams of the same copolymer mixture as in Example 9 were mixed with 0.5 gram Wax OP and the following metal salt stabilizer composition comprising 2.0 grams strontium butyl itaconate, 0.75 gram of magnesium 2-ethylhexyl maleate, 0.8 gram of zinc 2-ethylhexyl maleate, 2.0 grams glycerol mono-acetate, 2.0 grams epoxy soya bean oil and 0.25 gram dilauryl thiodipropionate. The resin and stabilizer mixture were milled in the manner described in Example 1 and after one hour's milling the plastic had degraded only to a bright yellow color.

EXAMPLE 14

100 grams of the same copolymer mixture as used in Example 9 and 0.25 gram Wax OP were mixed with a metal salt stabilizer composition comprising 2.0 grams calcium 2-ethylhexyl maleate, 0.75 gram magnesium 2-ethylhexyl maleate and 0.8 gram zinc 2-ethylhexyl maleate, 4.0 grams epoxy soya bean oil, 0.25 gram dilauryl thiodipropionate and 2.0 grams 1-4 cyclohexane dimethanol and the copolymer mixture and stabilizer composition were milled as described in Example 1. After one hour's milling, the plastic was only a bright yellow color.

EXAMPLE 15

100 grams of the copolymer mixture as used in Example 9 and 0.25 gram Wax OP were mixed with a metal salt stabilizer composition comprising 2.0 grams strontium 2-ethylhexyl maleate, 1.0 gram of sodium 2-ethylhexyl maleate, 0.75 gram magnesium 2-ethylhexyl maleate and 0.75 gram zinc 2-ethylhexyl maleate, 2.0 grams 2,2-dimethyl 1-3 propane diol, 0.5 gram dilauryl thiodipropionate and 4 grams of 3,4-epoxy-6-methyl cyclohexyl methyl 3,4-epoxy-6-methyl cyclohexane carboxylate. The copolymer mixture and stabilizer composition were milled in the manner already described and at the end of one hour the plastic was only a yellow color.

EXAMPLE 16

100 grams of a vinyl chloride/vinyl cetyl ether copolymer containing about 4 percent copolymerized vinyl cetyl ether were mixed with 1.0 gram Wax OP and a metal salt stabilizer composition comprising 2.0 grams calcium n-heptyl maleate, 0.75 gram magnesium 2-ethylhexyl maleate, 1.0 gram zinc 2-ethylhexyl maleate, 2.0 grams 2,2-dimethyl 1-3 propane diol, 0.5 gram dilauryl thiodipropionate and 4.0 grams epoxy linseed oil. The resin and stabilizer were milled at 170–175° C. After one hour's milling only a very pale yellow color had developed.

EXAMPLE 17

80 grams of a vinyl chloride/vinyl acetate copolymer containing 10 percent copolymerized vinyl acetate and 20 grams of a vinyl chloride-dioctyl fumarate copolymer containing 15 percent copolymerized dioctyl fumarate were mixed with 1.0 gram Wax OP and a metal salt stabilizer composition comprising 2.0 grams calcium 2-ethylhexyl maleate, 0.75 gram magnesium 2-ethylhexyl maleate, 1.0 gram zinc 2-ethylhexyl maleate, 2.0 grams 2,2-dimethyl 1-3 propane diol, 0.5 gram dilauryl thiodipropionate, and 4.0 grams of an epoxy compound consisting of a copolymer of glycidyl methacrylate and acrylonitrile (containing 20 percent acrylonitrile). The resin and stabilizer were milled at 165–170° C. After one hour's milling the plastic had degraded only to a light yellow color.

EXAMPLE 18

100 grams of a vinyl chloride homopolymer (K value 55) were mixed with 0.5 gram stearyl alcohol (lubricant) and a metal salt stabilizer composition comprising 1.5 gram calcium n-heptyl maleate, 1.0 gram zinc 2-ethylhexyl maleate, 0.75 gram magnesium 2-ethylhexyl maleate, 2.0 grams 2,2-dimethyl 1-3 propane diol, 0.5 gram dibenzyl sulfide, and 4.0 grams epoxy linseed oil. The resin and stabilizer were milled at 170–175° C. After 45 minutes' milling the plastic was a very pale yellow color.

By way of comparison a control composition containing all the ingredients except 2,2-dimethyl 1-3 propane diol and dibenzyl sulfide was bright yellow after milling under the same conditions for the same length of time.

EXAMPLE 19

Similar results to those of Example 18 were obtained when dithio-β,β-dipropionic acid was used in place of dibenzyl sulfide.

EXAMPLE 20

Similar results to those of Example 18 were obtained when S-benzyl thioglycollic acid was used in place of dibenzyl sulfide.

EXAMPLE 21

Similar results to those of Example 18 were obtained when bis(n-dodecyloxyethyl) sulfide was used in place of dibenzyl sulfide.

EXAMPLE 22

Similar results to those of Example 18 were obtained when dibenzoyl disulfide was used in place of dibenzyl sulfide.

EXAMPLE 23

100 grams of the resin components described in Example 9 and 2 grams Wax OP were mixed with a metal salt stabilizer composition comprising 2.0 grams calcium 2-ethylhexyl maleate, 0.75 gram magnesium 2-ethylhexyl maleate, 1.0 gram zinc 2-ethylhexyl maleate, 4.0 grams epoxy linseed oil, 0.5 gram dilauryl thiodipropionate, and 2.0 grams 2,2,4,4-tetramethyl 1-3 cyclobutane diol. The copolymer mixture and stabilizer composition were milled as described in Example 9. After 50 minutes milling the plastic was a light yellow color, while after one hour, the color was light orange.

EXAMPLE 24

100 grams of the resin components described in Example 9 and 2.0 grams Wax OP were mixed with a metal salt stabilizer composition comprising 2.0 grams calcium n-decyl maleate, 0.75 grams magnesium 2-ethylhexyl maleate, 1.0 gram zinc 2-ethylhexyl maleate, 4.0 grams epoxy linseed oil, 0.5 gram dilauryl thiodipropionate and 2.0 grams 2,2-dimethyl 1-3 propane diol. The resin and stabilizer were milled in a manner described in Example 9. After one hour's milling only a light yellow color was produced.

EXAMPLE 25

100 grams of the resin components described in Example 9 and 2.0 grams Wax OP were mixed with a metal salt stabilizer composition comprising 2.0 grams calcium n-octyl maleate, 0.75 gram magnesium 2-ethylhexyl maleate, 1.0 gram zinc 2-ethylhexyl maleate, 4.0 grams epoxy linseed oil, 0.5 gram dilauryl thiodipropionate and 2.0 grams 2,2-dimethyl 1-3 propane diol. The resin and stabilizer were milled in the manner already described in Example 9. After one hour's milling a light yellow color was produced.

EXAMPLE 26

100 grams of the resin composition described in Example 9 and 2.0 grams Wax OP were mixed with a metal salt stabilizer composition comprising 2.0 grams calcium n-heptyl maleate, 0.75 gram magnesium 2-ethylhexyl maleate, 1.0 gram zinc 2-ethylhexyl maleate, 4.0 grams epoxy linseed oil, 0.5 gram dilauryl thiodipropionate, and 2.0 grams 2,2-dimethyl 1-3 propane diol. The resin and stabilizer were milled in the manner described. After one hour's milling the plastic was only a very light yellow and after 75 minutes the plastic degraded a light brown color.

EXAMPLE 27

A polymer composition identical to that described in Example 19 but containing 4.0 grams of the diglycidyl ether in bisphenol A in place of the epoxy linseed oil was milled in the manner described. After one hour's milling the plastic degraded to a brown color.

EXAMPLE 28

100 grams of polymer Type HC 825L (manufactured by Kureha Chem. Co., Japan, and believed to be a vinyl chloride-vinyl alkyl ether copolymer) and 1.0 gram Wax OP were mixed with a metal salt stabilizer composition comprising 2.0 grams calcium n-heptyl maleate, 0.75 gram magnesium 2-ethylhexyl maleate, 1.0 gram zinc 2-ethylhexyl maleate, 4.0 grams epoxy linseed oil, 0.5 gram dilauryl thiodipropionate and 1.5 gram 2,2-dimethyl 1-3 propane diol. The resin and stabilizer were milled in the manner described. After one hour's milling hardly any color at all had developed and even after two hours' milling only a very light yellow was obtained.

What is claimed is:
1. A composition comprising
   (a) a chlorine containing polymer;
   (b) a stabilizing amount of
      $(b)_1$ at least three metal salts of mono esters of $\alpha,\beta$-ethylenically unsaturated dicarboxylic acids in which the metals are different and selected from the group consisting of zinc, lithium, sodium, potassium, strontium, calcium and magnesium, and wherein the proportion by weight of each of said metal salts in relation to the weight of said chlorine containing polymer is present in an amount of at least 0.25 percent;
      $(b)_2$ a polyhydric alcohol containing from 4 to 36 carbon atoms in the hydrocarbon moiety and at least two hydroxyl substituents wherein the number of hydroxyl groups present is less than the number of carbon atoms and wherein the proportion by weight of polyhydric alcohol in relation to the weight of chlorine containing polymer is in the range 0.25 to 10 percent, and
      $(b)_3$ an organic epoxide compound, wherein said epoxide compound is present in an amount of at least 0.5 percent by weight based on the weight of said polymer.

2. The composition of claim 1 wherein said metal salts are selected from the group consisting of strontium 2-ethylhexyl maleate, strontium butyl itaconate, calcium n-octyl maleate, calcium n-heptyl maleate, zinc 2-ethylhexyl maleate, sodium 2-ethylhexyl maleate, and magnesium 2-ethylhexyl maleate.

3. The composition of claim 1 wherein said epoxide compound is selected from the group consisting of epoxy linseed oil, the diglycidyl ether of 2,2-diphenylol propane and 3,4-epoxy-6-methyl cyclohexyl methyl 3,4-epoxy-6-methyl cyclohexane carboxylate.

References Cited

UNITED STATES PATENTS

| 2,590,059 | 3/1952 | Winkler | 260—45.75 |
| 2,669,549 | 2/1954 | Darby | 260—23 |
| 2,795,570 | 6/1957 | Fuchs et al. | 260—45.75 |
| 3,054,771 | 9/1962 | Hiestand et al. | 260—23 |
| 3,231,531 | 1/1966 | Buckley et al. | 260—23 |
| 3,262,896 | 7/1966 | Ackerman | 260—23 |
| 2,711,401 | 6/1955 | Lally | 260—45.75 |

FOREIGN PATENTS 748,351  5/1956  Great Britain.

OTHER REFERENCES

Smith, Rubber Journal & International Plastics, vol. 136, May 2, 1959, p. 658.

DONALD E. CZAJA, *Primary Examiner.*

R. A. WHITE, *Assistant Examiner.*

U.S. Cl. X.R.

260—45.75, 45.8, 45.85, 45.95